United States Patent
Choi et al.

(10) Patent No.: US 7,714,492 B2
(45) Date of Patent: May 11, 2010

(54) ELECTRON EMISSION MATERIAL AND ELECTRON EMISSION PANEL HAVING THE SAME

(75) Inventors: Young-Chul Choi, Suwon-si (KR); Jong-Hwan Park, Suwon-si (KR); Jong-Seo Choi, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 916 days.

(21) Appl. No.: 11/491,082

(22) Filed: Jul. 24, 2006

(65) Prior Publication Data

US 2007/0024180 A1 Feb. 1, 2007

(30) Foreign Application Priority Data

Jul. 29, 2005 (KR) ............... 10-2005-0069652

(51) Int. Cl.
*H01J 1/02* (2006.01)
(52) U.S. Cl. .................. 313/309; 313/336; 313/351
(58) Field of Classification Search ........... 313/309, 313/310, 336, 351, 495
See application file for complete search history.

(56) References Cited

U.S. PATENT DOCUMENTS

| 3,745,403 A * | 7/1973 | Misumi ............ 313/341 |
| 2005/0023950 A1 | 2/2005 | Yoon et al. ......... 313/311 |
| 2005/0156506 A1 | 7/2005 | Chung et al. ........ 313/495 |

FOREIGN PATENT DOCUMENTS

| EP | 1 383 151 | 1/2004 |
| WO | WO 02/47103 | 6/2002 |

OTHER PUBLICATIONS

Shen, X, et al. "Preparation and electromagnic performance of coating of multiwall carbon nanotubes with iron nanogranule", Journal of Magnetism and Magnetic Materials, Elsevier Science Publishers, Amsterdam, NL, vol. 288, pp. 397-402, (Mar. 2005).
Wei, X., et al., "Coating multi-walled carbon nanotubes with metal sulfides", Materials Chemistry and Physics, Elsevier, NL., vol. 92, No. 1, pp. 159-163, (Jul. 15, 2005).

* cited by examiner

*Primary Examiner*—Vip Patel
(74) *Attorney, Agent, or Firm*—Lee & Morse, P.C.

(57) ABSTRACT

An electron emission material includes an electron emission material main body, a base metal layer disposed on the electron emission material main body, and a thermal electron emission layer disposed on the base metal layer.

21 Claims, 6 Drawing Sheets

ELECTRON EMISSION MATERIAL AND ELECTRON EMISSION PANEL HAVING THE SAME

BACKGROUND OF THE INVENTION

1. Field of the Invention

The present invention relates to an electron emission material and an electron emission panel having the same. More particularly, the present invention relates to an electron emission material that can be used both as a cold cathode and a thermionic cathode, and an electron emission panel having the same.

2. Description of the Related Art

Generally, electron emission devices use a thermionic cathode or a cold cathode as an electron emission source. The Edison effect is a term used to describe the emission of electrons from electron emission devices using the thermionic cathode. The Edison effect describes a phenomenon whereby electrons are emitted from the surface of a metal or a semiconductor heated to a high temperature. That is, electrons are emitted from the surface of a solid when the electrons acquire sufficient energy to be emitted from an atom. The Edison effect is also called the Richardson effect or thermal electron emission phenomenon, and has been applied to a vacuum tube or a discharge tube, also generally known as a thermionic tube, as applied to vacuum tubes for various communication systems, Coolidge tubes (an X-ray tube), etc.

Electrons emitted from the surface of a metal or semiconductor through the Edison effect may be referred to as thermal electrons and a material that emits the electrons may be referred to as a thermionic cathode. A current generated by the migration of the thermal electrons from a thermionic cathode toward an anode, which may be disposed to face the thermionic cathode and may have a high positive (+) voltage, may be referred to as a thermal electron current or an electron emission current.

Generally, the electron emission current from a thermionic cathode increases as the temperature increases. However, the electron emission current may vary according to the kind of thermionic cathode or the surface of the thermionic cathode. For example, alkali earth metal oxides may emit electrons at a lower temperature than pure metals. The cathode of a small vacuum tube, which may be used at a relatively low voltage, may be formed of, e.g., tungsten or tungsten mixed with thorium, and there are many examples that use a metal oxide of these metals. Also, the Edison effect depends on the work function of a material, which describes the energy required to free an electron from a material. Tungsten emits electrons at a temperature of approximately 2427° C. (a work function of approximately 4.5 eV), and thorium-tungsten emits electrons at a temperature of approximately 1627° C. (a work function of approximately 2.6 eV).

Electron emission devices that use a cold cathode include Field Emission Device (FED) type devices, Surface Conduction Emitter (SCE) type devices, Metal Insulator Metal (MIM) type devices, Metal Insulator Semiconductor (MIS) type devices, Ballistic electron Surface Emitting (BSE) type devices, etc.

FEDs use the principle that, when a material having a low work function or a high $\beta$ function is used as an electron emission material, the material readily emits electrons in a vacuum due to an electric field formed between two or more electrodes. FEDs have been developed that employ a tapered tip structure formed of, e.g., Mo, Si, etc. as a main component, a carbon group material such as graphite, diamond like carbon (DLC), etc., or a nano structure such as nanotubes, nanowires, etc.

However, FEDs that use carbon nanotubes may be unsatisfactory for some applications, in that the lifetime of the electron emission material may be short and the electron emission may be small. Commercialization of FEDs has been hampered because they tend to exhibit low current densities. When a display device is manufactured from an electron emission device that emits few electrons, brightness and light emission efficiency of the display device may be low. Therefore, there is a need to develop an electron emission material having good electron emission efficiency, and an electron emission panel having the same.

SUMMARY OF THE INVENTION

The present invention is therefore directed to an electron emission material and an electron emission panel having the same, which substantially overcome one or more of the problems due to the limitations and disadvantages of the related art.

It is therefore a feature of an embodiment of the present invention to provide an electron emission material that exhibits a long lifespan and provides a high current density.

It is therefore another feature of an embodiment of the present invention to provide an electron emission material that emits electrons through field emission and thermionic emission.

It is therefore a further feature of an embodiment of the present invention to provide an electron emission device suitable for use as a display or as a backlight of a non-emissive display.

At least one of the above and other features and advantages of the present invention may be realized by providing an electron emission material including an electron emission material main body, a base metal layer disposed on the electron emission material main body, and a thermal electron emission layer disposed on the base metal layer.

The electron emission material main body may be capable of emitting electrons through field emission when a voltage is applied thereto under a vacuum. The electron emission material main body may be a carbon nanotube. The thermal electron emission layer may include at least one of BaO, SrO and CaO. The thermal electron emission layer may be formed by applying a carbonate coating to the base metal layer and then heating until the coating decomposes to release carbon dioxide. The base metal layer may be a Ni alloy and may include about 0.01 to about 0.5 wt % of at least one of Mg and Si, based on the weight of the Ni alloy. The total thickness of the base metal layer and the thermal electron emission layer may be about 1 nm to about 1000 nm.

At least one of the above and other features and advantages of the present invention may also be realized by providing an electron emission panel, including a first substrate, a cathode electrode disposed on the first substrate, an electron emission material electrically connected to the cathode electrode, and a gate electrode spaced apart from the cathode electrode, wherein the electron emission material includes an electron emission material main body, a base metal layer disposed on the electron emission material main body, and a thermal electron emission layer disposed on the base metal layer.

The panel may be operable to emit electrons through field emission, and operating the panel so as to emit electrons through field emission may elevate the temperature of the electron emission material so as to emit thermionic electrons.

The gate electrode may be disposed on the first substrate, the electron emission panel may further include a first insulating layer disposed on the cathode electrode and the first substrate, and the first insulating layer may be disposed between the gate electrode and the cathode electrode.

The cathode electrode and the gate electrode may be disposed side-by-side on the first substrate, the cathode electrode and the gate electrode may each have a layer of the electron emission material disposed thereon, and the layer of electron emission material disposed on the cathode electrode may be separated from the layer of electron emission material disposed on the gate electrode by a predetermined gap.

The electron emission panel may further include a second substrate spaced apart from the first substrate, an anode electrode disposed on the second substrate, and a phosphor layer disposed on the second substrate. The electron emission panel may further include a display disposed facing the electron emission panel, wherein the display includes a plurality of pixels for forming an image, and light produced by the electron emission panel illuminates the display.

At least one of the above and other features and advantages of the present invention may further be realized by providing an electron emission panel operable to produce electrons using field emission and thermionic emission of electrons, the electron emission panel including a first electrode on a first substrate, an electron emission material in contact with the first electrode, the electron emission material including a field emitter having a metal layer thereon, and a thermal electron emission layer on the metal layer, a second electrode, and a third electrode, wherein the electron emission panel is configured to induce field emission and thermionic emission of electrons from the electron emission material upon application of one or more electrical signals to the first, second and third electrodes.

The electron emission panel may further include a light emitting material positioned to receive electrons emitted from the electron emission material, wherein the light emitting material emits visible light upon excitation by the electrons emitted from the electron emission material. An inner space of the panel may be maintained in a vacuum state, the electron emission material and the light emitting material being disposed in the inner space and separated by a predetermined distance.

At least one of the above and other features and advantages of the present invention may also be realized by providing an electron emission material including an electron emission material main body and a thermal electron emission layer, the electron emission material formed by a process of providing the electron emission material main body, forming a base metal layer on the electron emission material main body, and forming the thermal electron emission layer on the base metal layer.

The electron emission material main body may be a carbon nanotube. The thermal electron emission layer may include at least one of BaO, SrO and CaO. The thermal electron emission layer may be formed by applying at least one of $BaCO_3$, $SrCO_3$ and $CaCO_3$ to the base metal layer, and converting the at least one of $BaCO_3$, $SrCO_3$ and $CaCO_3$ to the at least one of BaO, SrO and CaO, respectively, using in situ decomposition. The base metal layer may be a Ni alloy and may include about 0.01 to about 0.5 wt % of at least one of Mg and Si, based on the weight of the Ni alloy.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Korean Patent Application No. 10-2005-0069652, filed on Jul. 29, 2005, in the Korean Intellectual Property Office, and entitled: "Electron Emission Material for Emitting Thermal Electron, Electron Emission Device Having the Same, and Flat Display Apparatus Having the Same," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. It will also be understood that the term "phosphor" is intended to generally refer to a material that can generate visible light upon excitation by electrons that impinge thereon, and is not intended be limited to materials the undergo light emission through any particular mechanism or over any particular time frame. Like reference numerals refer to like elements throughout.

Figure 1:
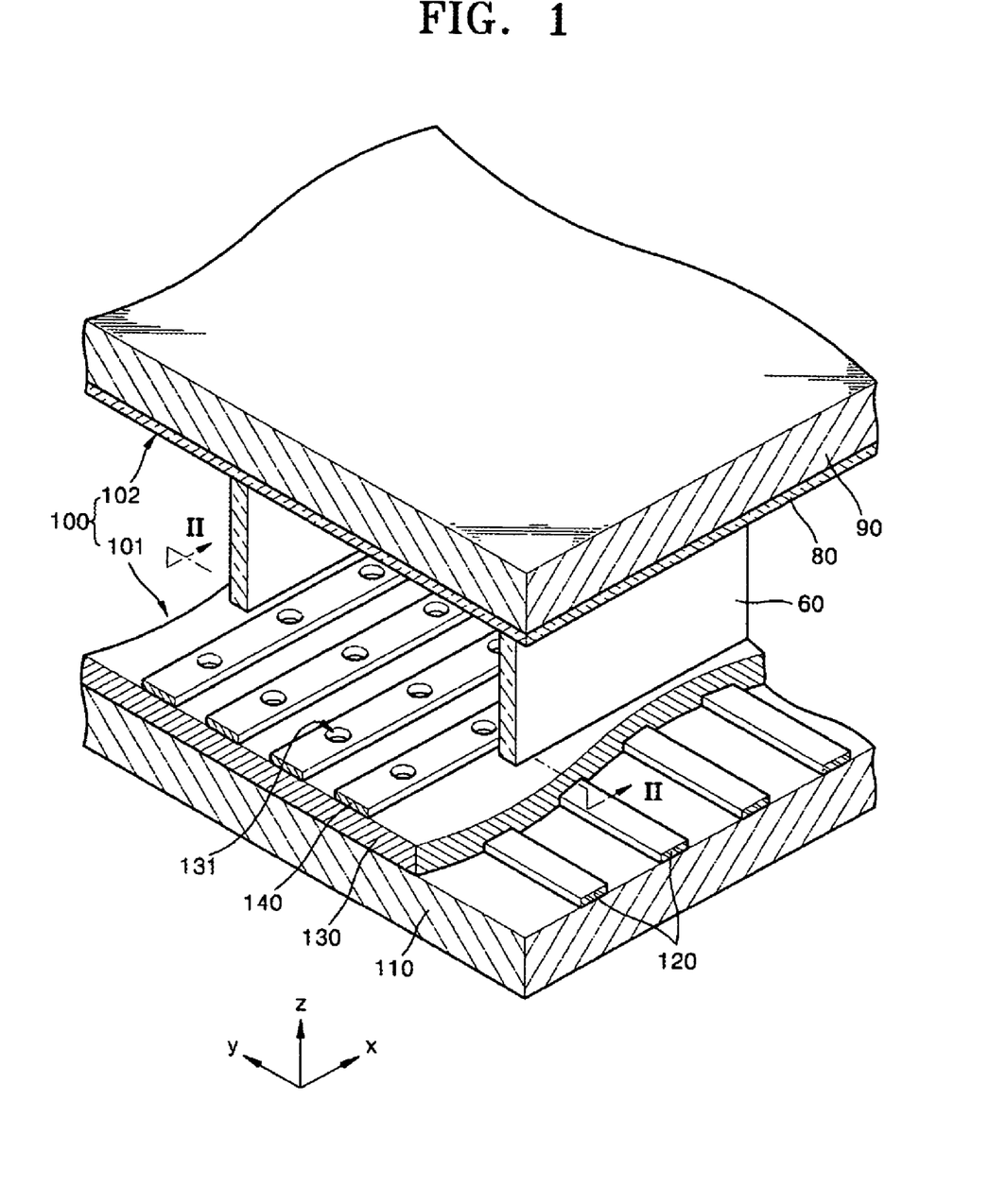
FIG. 1 illustrates a partial perspective view of a flat panel display device using an electron emission device according to a first embodiment of the present invention.
Figure 2:
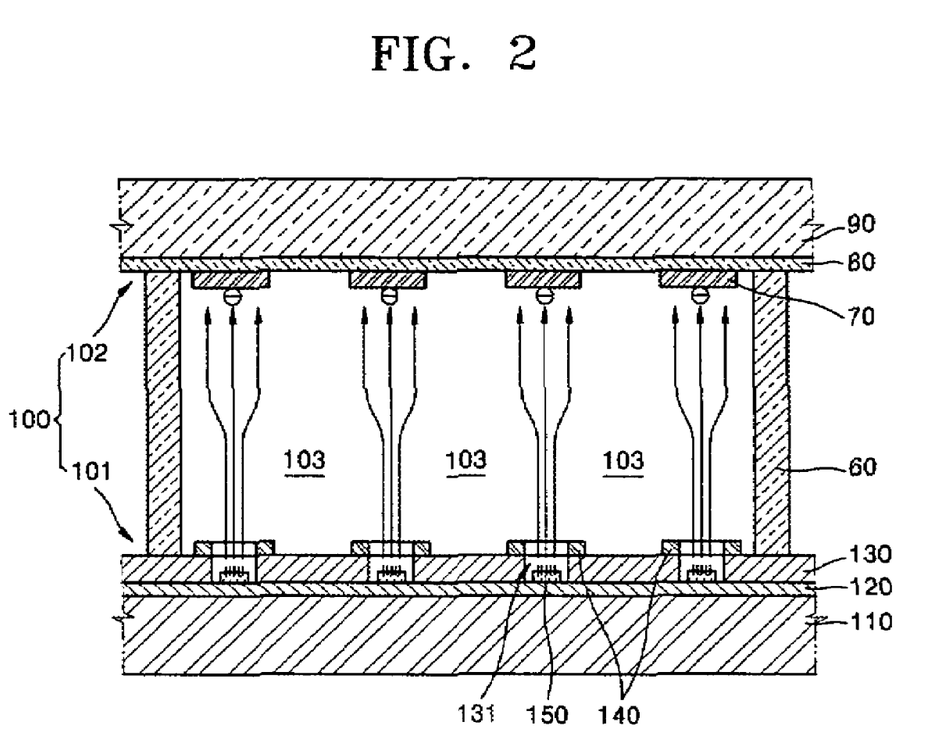
FIG. 2 illustrates a cross-sectional view taken along line II-II of FIG. 1.

FIG. 1 illustrates a partial perspective view of a flat panel display device using an electron emission device according to a first embodiment of the present invention and FIG. 2 illustrates a cross-sectional view taken along line II-II of FIG. 1. Referring to FIGS. 1 and 2, an electron emission display device 100 may include an electron emission device 101 and a front panel 102, which may be disposed parallel to and facing each other. A plurality of spacers 60 may be provided in order to maintain a gap between the electron emission device 101 and the front panel 102, the gap defining a vacuum space 103.

The electron emission device 101 may include a first substrate 110, a plurality of gate electrodes 140 and cathode electrodes 120 on the first substrate 110, and an insulating layer 130 interposed between the gate electrodes 140 and the cathode electrodes 120 to electrically insulate the gate electrodes 140 from the cathode electrodes 120. The gate electrodes 140 and the cathode electrodes 120 may cross each other, e.g., at right angles. Electron emission holes 131 may be formed in regions where the gate electrodes 140 and the cathode electrodes 120 overlap, and electron emission sources 150 may be formed in the electron emission holes 131.

The front panel 102 may include a second substrate 90, an anode electrode 80 disposed on the second substrate 90, e.g., on the lower surface thereof, and phosphor layers 70 may be disposed on a surface of the anode electrode 80.

The first substrate 110 and the second substrate 90 may be planar members having predetermined thicknesses, and may be, e.g., glass substrates formed of quartz glass, glass containing a small amount of an impurity such as Na, plate glass, glass coated with $SiO_2$, aluminum oxide, ceramic, etc. The spacers 60 may be formed of, e.g., an insulating material.

The cathode electrodes 120 and the gate electrodes 140 may be formed of a suitable electrically conductive material, e.g., a metal such as Al, Ti, Cr, Ni, Au, Ag, Mo, W, Pt, Cu, Pd, etc., or an alloy of such metals, a printed conductive material made by mixing glass with a metal such as Pd, Ag, $RuO_2$, Pd—Ag, etc., or a metal oxide of such metals, a transparent conductive material such as $In_2O_3$, $SnO_2$, etc., or a semiconductor material such as polycrystalline silicon, etc.

Edges of the first substrate 110 of the electron emission device 101 and edges of the second substrate 90 of the front panel 102 may be bonded using, e.g., glass frit, to seal the vacuum space 103 (not shown). The vacuum space 103 may be pumped down and maintained in a vacuum state, i.e., at below atmospheric pressure.

To be used for a display device, the gate electrodes 140 and the cathode electrodes 120 of the electron emission device 101 may cross each other to define pixels and thereby display an image.

Figure 3:
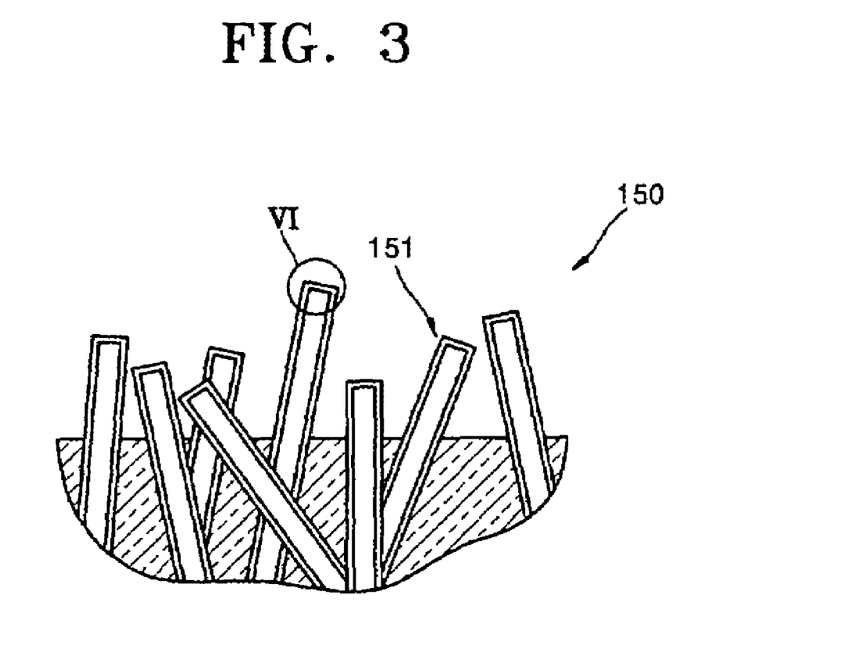
FIG. 3 illustrates an enlarged view of the surface of the electron emission source of FIGS. 1 and 2.
Figure 4:
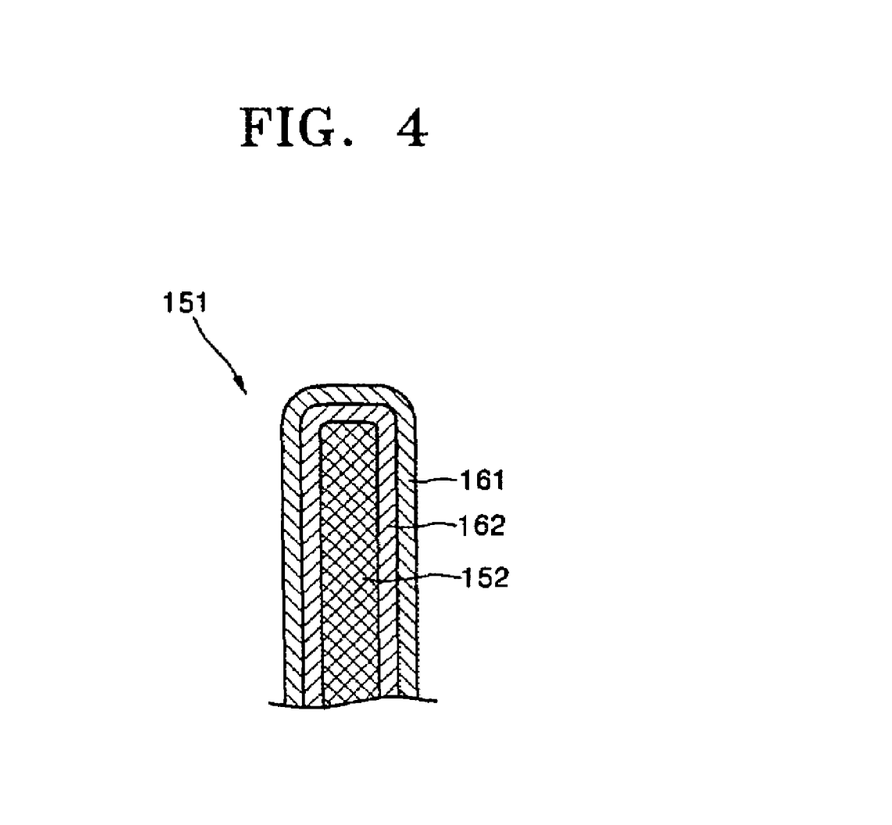
FIG. 4 illustrates an enlarged view of portion VI of FIG. 3.

FIG. 3 illustrates an enlarged view of the surface of the electron emission source of FIGS. 1 and 2, and FIG. 4 illustrates an enlarged view of portion VI of FIG. 3. Referring to FIGS. 3 and 4, the electron emission source 150 may be formed of an electron emission material 151, which may include an electron emission material main body 152 having a coating for emitting thermal electrons on the surface thereof. The coating may include a base metal layer 162 that contacts the surface of the electron emission material main body 152 and a thermal electron emission layer 161 formed on the surface of the base metal layer 162.

The electron emission material main body 152 may be formed of a material that can emit electrons through field emission. The electron emission material main body 152 may have an elongated shape, e.g., a needle-like shape. The electron emission material main body 152 may be, e.g., a nanotube, a nanowire, a nanofiber formed of carbon such as graphite, diamond like carbon (DLC), etc. Where the electron emission material main body 152 is a nanotube, the nanotube may be a single-walled carbon nanotube (SWCNT), a multi-walled carbon nanotube (MWCNT), etc. Combinations of these materials may also be suitable.

The base metal layer 162 may be formed of, e.g., a Ni alloy. The Ni alloy may contain about 0.01 to about 0.5 wt % of at least one of Mg and Si, based on the weight of the Ni alloy.

The thermal electron emission layer 161 may be formed of, e.g., a material containing one or more of BaO, SrO and CaO. The thermal electron emission layer 161 may emit thermal electrons at a temperature range of about 600° C. to about 800° C. The thermal electron emission layer 161 may not initially include the oxide such as BaO, SrO or CaO. That is, the thermal electron emission layer 161 may be formed from a material other than the oxide and then processed to generate the oxide in situ.

For example, carbonates such as barium carbonate ($BaCO_3$), strontium carbonate ($SrCO_3$) and/or calcium carbonate ($CaCO_3$) may be coated on the base metal layer 162. Next, the inside of the display device may be evacuated to form a vacuum therein. Next, by forming an electric field between the cathode electrode 120 and the gate electrode 140 facing the cathode electrode 120, electrons may be emitted from the electron emission material main body 152. In the process of the electron emission, the temperature of the electron emission material main body 152 may be heated to about 800° C. As a result, the carbonate may decompose to release carbon dioxide and convert the carbonate into an oxide coating.

The method of coating the electron emission material main body 152 with carbonates such as $BaCO_3$, $SrCO_3$ and/or $CaCO_3$ may include, e.g., a physical deposition method such as sputtering, a liquid phase coating method in which the electron emission material main body 152 is immersed in a solvent containing $BaCO_3$, $SrCO_3$ and/or $CaCO_3$, etc. The coating can be simply formed using any of the above coating methods.

The total thickness of the base metal layer 162 and the thermal electron emission layer 161 may be about 1 nm to about 1000 nm. If the total the thickness of the base metal layer 162 and the thermal electron emission layer 161 is less than 1 nm or exceeds 1000 nm, emission of thermal electrons may be difficult.

The oxides in the thermal electron emission layer 161 may be further activated through a current activation process, wherein an electrical current is caused to flow through the electron emission material main body 152. In the current activation process, the oxides in the thermal electron emission layer 161 may be reduced through a reaction with Si or Mg contained in the base metal layer 162, thereby producing, e.g., $Ba^{2+}$, $Sr^{2+}$ and/or $Ca^{2+}$ ions. The activated material may then be employed to emit electrons through field emission and thermionic emission during routine operation of the electron emission device 100.

The operation of the electron emission device 100 and the flat panel display device 100 according to an embodiment of the present invention will now be described. To induce the emission of electrons from the electron emission source 150 disposed on the cathode electrode 120, a negative (−) voltage may be applied to the cathode electrode 120 and a positive (+) voltage may be applied to the gate electrode 140. Also, a strong positive (+) voltage may be applied to the anode electrode 80 to the electrons traveling toward the anode electrode 80. When the voltages are applied to the electrodes in this manner, the electrons emitted from the each electron emission material 151 included in the electron emission source 150 may travel toward the gate electrode 140 and be accelerated toward the anode electrode 80.

During electron emission, an end of the electron emission material main body 152 may be heated to above 800° C. Electrons may be emitted from the thermal electron emission layer 161 as a result of the heating. Accordingly, the number of electrons emitted from the each electron emission material 151 may be increased, i.e., current density may be increased. The accelerated electrons may generate visible light by exciting the phosphor layer 70 disposed on the anode electrode 80.

A method of manufacturing an electron emission device according to an embodiment of the present invention will now be described, although the description that follows merely sets forth an exemplary method and the present invention is not limited thereto.

A first substrate 110, a cathode electrode 120, an insulating layer 130 and a gate electrode 140 may be sequentially stacked to a predetermined thickness using respective materials for each of the elements. The stacking may be performed using a process such as screen printing.

Next, a mask pattern having a predetermined thickness may be formed on the upper surface of the gate electrode 140. The mask pattern, which can be used for forming electron emission holes 131, may be formed through a photolithography process wherein a photoresist is coated on the upper surface of the gate electrode 140 and then exposed, using e.g., UV light or an E-beam, to form the mask pattern.

The electron emission holes 131 may be formed by patterning the gate electrode 140, the insulating layer 130 and the cathode electrode 120 using an etching process through the mask pattern. The etching process may be, e.g., wet etching using an etching solution, dry etching using a corrosive gas, micro machining using an ion beam, etc., as suits the materials forming the gate electrode 140, the insulating layer 130 and the cathode electrode 120.

An electron emission material paste, which may be separately prepared, may then be applied. The electron emission material paste may include the electron emission material 151, wherein the electron emission material main body 152 is coated with the base metal layer 162 and the thermal electron emission layer 161.

In an implementation, the electron emission material 151 may be formed by providing the electron emission material main body 152, forming the base metal layer 162 on the electron emission material main body 152 and forming the thermal electron emission layer 161 on the base metal layer 162. The electron emission material main body 152 may be, e.g., a carbon nanotube and the base metal layer 162 may be, e.g., a Ni alloy including about 0.01 to about 0.5 wt % of at least one of Mg and Si, based on the weight of the Ni alloy. The thermal electron emission layer may include, e.g., at least one of BaO, SrO and CaO, which may be formed in situ by applying $BaCO_3$, $SrCO_3$ and/or $CaCO_3$, respectively, to the base metal layer and decomposing the $BaCO_3$, $SrCO_3$ and/or $CaCO_3$, e.g., through thermal decomposition.

The electron emission holes 131 may be coated with the electron emission material paste. The coating process may be performed by, e.g., screen printing, after which a process for hardening a portion of the electron emission material paste in order to form the electron emission source 150 may be performed. An electron emission material paste that includes a photosensitive resin may be hardened differently from an electron emission material paste that does not include a photosensitive resin.

When the electron emission material paste includes a photosensitive resin, an exposure process may be used. For example, in the case that the electron emission material paste includes a negative photosensitive resin that hardens when it is exposed to light, the electron emission material paste may be coated with a photoresist in a photolithography process. The electron emission source 150 may then be formed by selectively irradiating light to harden only a necessary portion of the electron emission material paste, e.g., by using a mask. Next, after the exposure, the forming of the electron emission device 101 may be completed by developing the resultant product to remove the photoresist and any unhardened portion of the electron emission material paste.

If electron emission material paste does not include a photosensitive resin, the electron emission source 150 may be formed by using a photoresist film to form a photoresist pattern, after which the electron emission material paste may be screen printed using the photoresist pattern.

The printed electron emission material paste may be subjected to a baking process under an oxygen gas or a nitrogen gas atmosphere containing less than about 1000 ppm of oxygen, e.g., about 10 ppm to about 500 ppm. Through the baking process under the oxygen gas atmosphere, the adhesion of the electron emission source 150 to the substrate may be increased, volatile vehicle in the electron emission source 150 may be evaporated and other materials such as inorganic binders may be melted and solidified, thereby contributing to the durability of the electron emission source 150.

The baking temperature may be determined in consideration of the temperature and time required to vaporize any volatile vehicle included in the electron emission material paste. For example, the baking temperature may be about 350° C. to about 500° C., e.g., about 450° C. A baking temperature that is lower than 350° C. may lead to insufficient vaporization of the vehicle. A baking temperature that exceeds 500° C. may increase manufacturing costs and may deform the substrates.

If necessary, an activation process for the baked product may be performed. In an embodiment of the activation process, after a solution that can be hardened to a film through heat treatment, for example, a solution of an electron emission source surface treating agent containing a polyimide group polymer, is coated on the baked product, the solution-coated baked product may be baked again. Afterward, a film formed by the baking process may be exfoliated to erect the carbon nanotubes, i.e., point them upward.

In another embodiment of the activation process, an adhesion unit may be formed on the surface of a roller driven by a predetermined driving force, and, to activate the baked product, the surface of the baked product may be pressed using the adhesion unit with a predetermined pressure. Through the activation process, nano-sized electron emission materials may be erected upward.

The electron emission material paste may include a vehicle for controlling the printability and viscosity thereof. The vehicle may include a resin component and a solvent component. The resin component may include one or more agents such as a cellulose group resin, e.g., ethylcellulose, nitrocellulose, etc., an acryl group resin, e.g., polyester acrylate, epoxy acrylate, urethane acrylate, etc., a vinyl group resin, e.g. polyvinyl acetate, polyvinyl butyral, polyvinyl ether, etc., or other materials. Some of the aforementioned resin components may also simultaneously serve as a photosensitive resin. The solvent component may include one or more agent such as terpineol, butyl carbitol (BC), butyl carbitol acetate (BCA), toluene, and texanol, etc.

The electron emission material paste may also include a photosensitive resin, a photoinitiator and/or a filler. The photosensitive resin may be, e.g., an acrylate group monomer, a benzophenone group monomer, an acetophenone group monomer, a thioxanthone group monomer, etc. More specifically, the photosensitive resin may be epoxy acrylate, polyester acrylate, 2,4-diethylthioxanthone (CAS No. 82799-44-8), 2,2-dimethoxy-2-phenylacetophenone (CAS No. 24650-42-8), etc.

The photoinitiator initiates a cross linking of the photosensitive resin when the photosensitive resin is exposed to light. The photoinitiator may be, e.g., benzophenone, etc. The photoinitiator may be present at about 5 to about 8 parts by weight, based on 1 part by weight carbon group material. Also, if the amount of the photoinitiator is less than about 3 parts by weight of the photosensitive resin, an effective bridging bond may not be achieved, which may result in the forming of a pattern, and when the content of the photoinitiator exceeds about 10 parts by weight of the photosensitive resin, manufacturing costs may increase.

The filler may increase conductivity and may be employed when a nano-sized inorganic material does not have a sufficient adhesive force with the substrate. Examples of the filler include, e.g., Ag, Al, etc.

Figure 5:
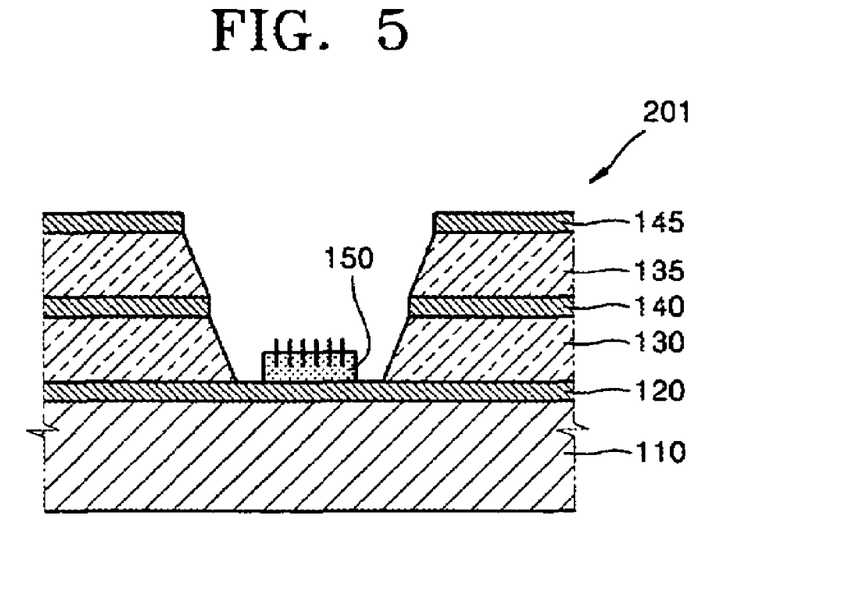
FIG. 5 illustrates a cross-sectional view of an electron emission device according to a second embodiment of the present invention.

FIG. 5 illustrates a cross-sectional view of an electron emission device according to a second embodiment of the present invention. Referring to FIG. 5, an electron emission device 201 may include a second insulating layer 135 and a focusing electrode 145 in addition to the substrate 110, the cathode electrode 120, the gate electrode 140, the insulating layer 130 and the electron emission source 150 included in the electron emission device 101 (refer to FIGS. 1 and 2).

The focusing electrode 145 may be insulated from the gate electrode 140 by the second insulating layer 135 and may focus electrons that are emitted from the electron emission source 150 by the electric field formed between the gate electrode 140 and the cathode electrode 120. The electron emission of the electron emission device 201 with the focusing electrode 145 may be significantly increased when the electron emission material having a thermal electron emission layer according to the present invention is used in the electron emission source 150.

Figure 6:
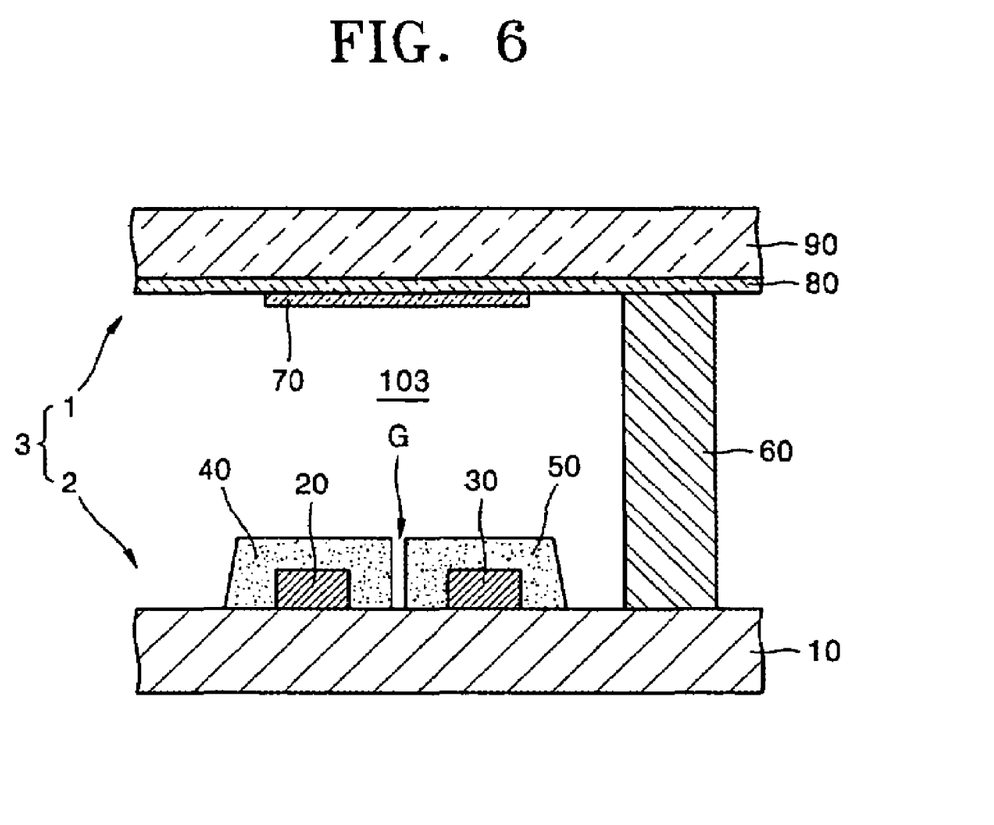
FIG. 6 illustrates a partial cross-sectional view of a flat panel display device and an electron emission device according to a third embodiment of the present invention.

FIG. 6 illustrates a partial cross-sectional view of a flat panel display device and an electron emission device according to a third embodiment of the present invention. Referring to FIG. 6, the flat panel display device 3 may include an electron emission device 2 and a front panel 1. The front panel 1 may include the second substrate 90, and the anode electrode 80 and the phosphor layer 70 formed on a lower surface of the front substrate 90. The phosphor layer may be formed on the anode electrode 80, as illustrated, or, in another implementation, may be formed under the anode electrode 80 (not shown).

The electron emission device 2 may include a first substrate 10 disposed in parallel to and facing the second substrate 90, at least one cathode electrode 20 formed in a striped pattern on the first substrate 10, at least one gate electrode 30 formed in a striped pattern parallel to the cathode electrode 20, and electron emission layers 40 and 50 that respectively surround the cathode electrode 20 and the gate electrode 30. An electron emission gap G may be defined between the electron emission layers 40 and 50.

A vacuum space 103 may be defined between the front panel 1 and the electron emission device 2, which may be maintained at a vacuum, i.e., a pressure lower than atmospheric pressure. Spacers 60 may be interposed between the front panel 1 and the electron emission device 2 to maintain the spacing between the front panel 1 and the electron emission device 2.

The electron emission material having a thermal electron emission layer according to the present invention, as described above, may be used as the electron emission layers 40, 50 in the device illustrated in FIG. 6. The electron emission efficiency of the electron emission device may be significantly enhanced due to the increased current density afforded by the electron emission material according to the present invention, thereby increasing the brightness and lifetime of the display device.

The electron emission devices 101, 201 and 2 of FIGS. 1, 5 and 6 may be used for a backlight unit (BLU), i.e., a surface light source having a predetermined small area. For example, the electron emission devices 101, 201 and 2 may be used for a BLU of a non-emissive display such as a liquid crystal display (LCD). When used as a BLU, the phosphor may be selected to emit visible light having a desired color, or phosphor layers of red, green and blue light phosphors may be provided in an appropriate ratio to generate white light.

Figure 7:
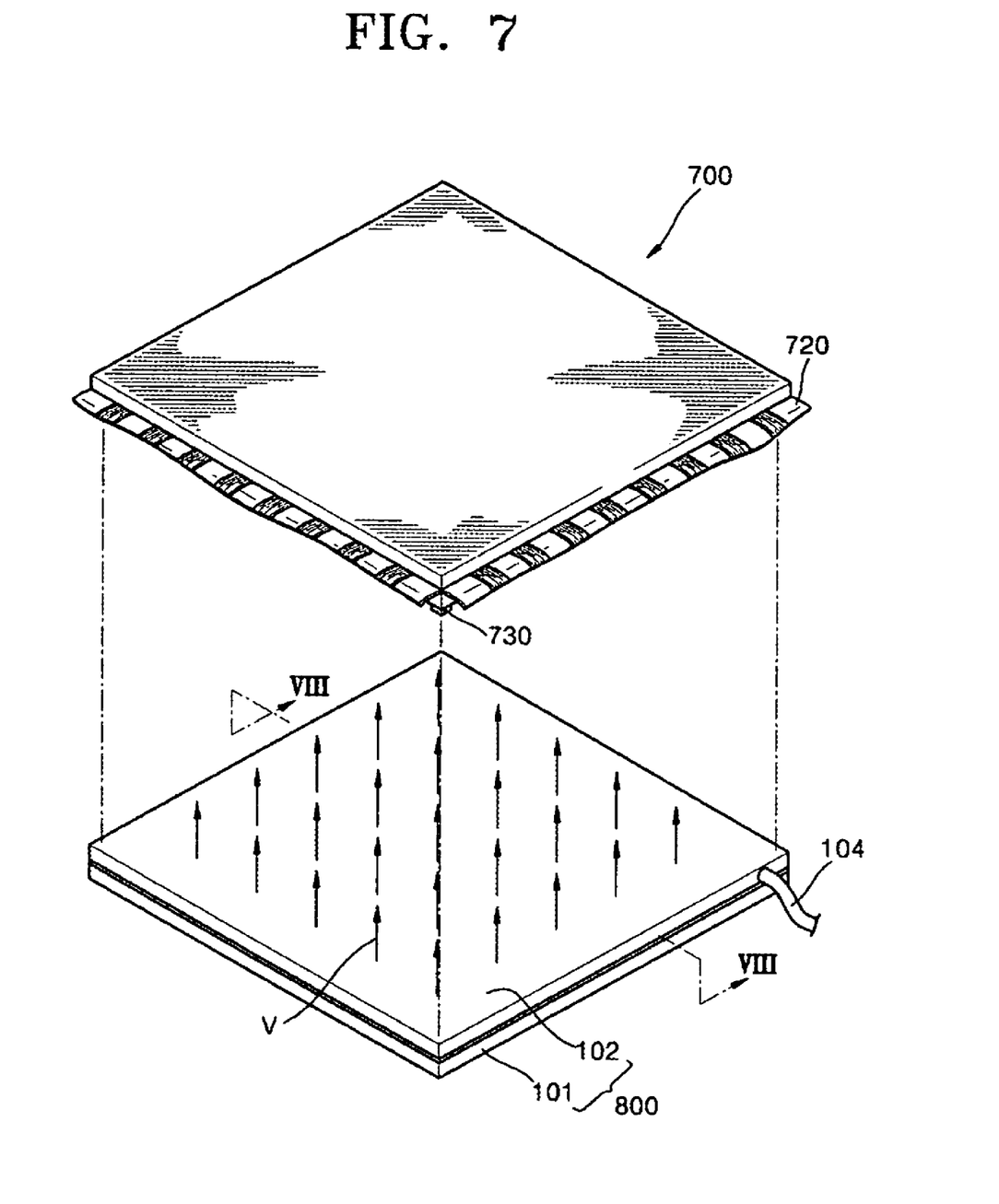
FIG. 7 illustrates an exploded perspective view of a flat panel display device that uses the electron emission device depicted in FIGS. 1 and 2 as the backlight unit.
Figure 8:
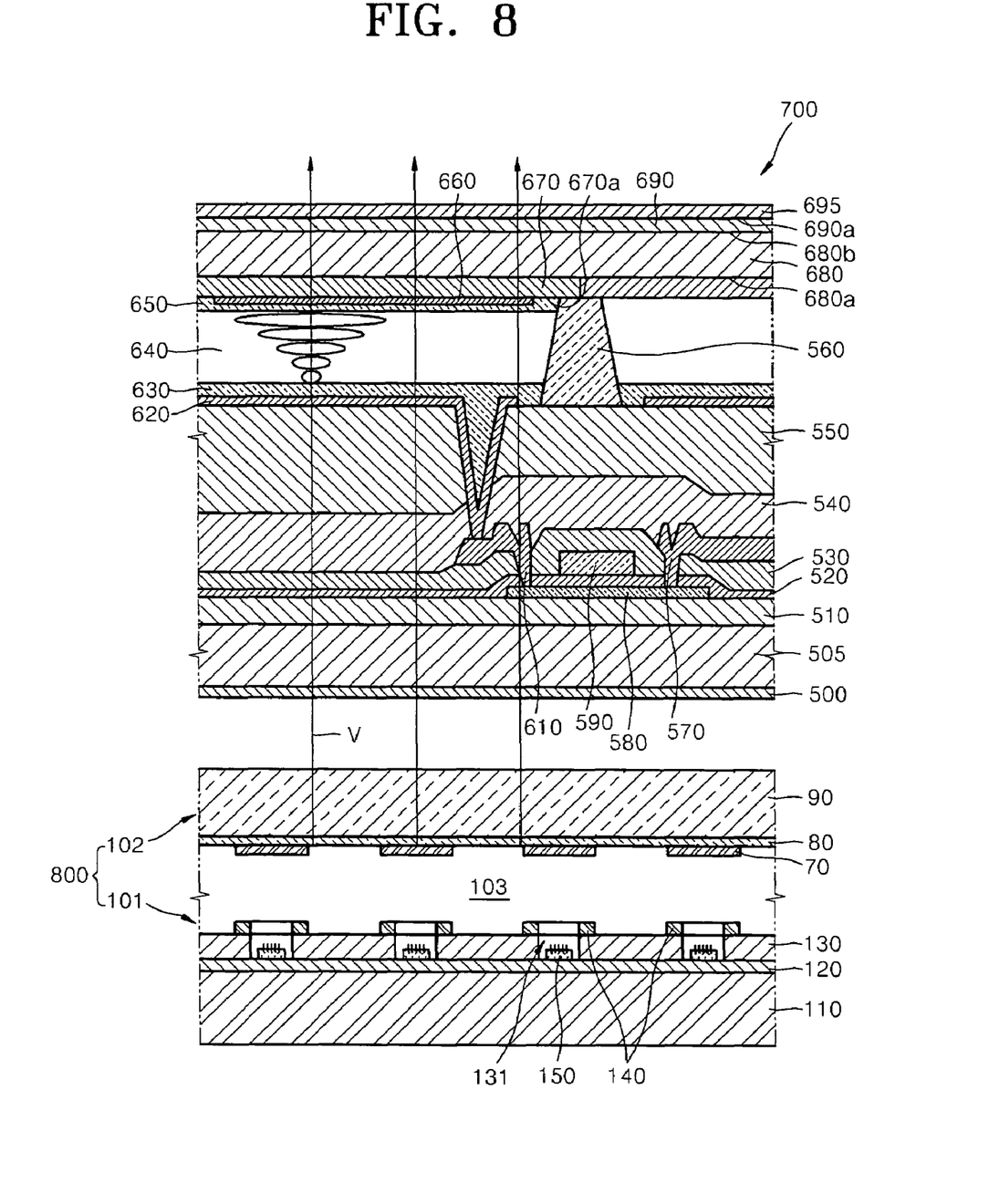
FIG. 8 illustrates a cross-sectional view taken along line VIII-VIII of FIG. 7, with the flat panel display device in an assembled state.

FIG. 7 illustrates an exploded perspective view of a flat panel display device that uses the electron emission device depicted in FIGS. 1 and 2 as the backlight unit, and FIG. 8 illustrates a cross-sectional view taken along line VIII-VIII of FIG. 7, with the flat panel display device in an assembled state. In the following description, identical element names, such as gate electrode, spacer, etc., may be used to describe parts of both the electron emission device and the flat panel display device. However, unless the elements are described using the same reference numeral, it will be understood that identical element names do not necessarily connote identical elements in both the electron emission device and the flat panel display device.

Referring to FIG. 7, the flat panel display device may be a non-emissive display device such as an LCD panel 700. The LCD panel 700 may be disposed in parallel to and facing a BLU 800 that supplies light to the LCD panel 700. The BLU 800 may be located to the rear of the LCD panel 700. A flexible printed circuit substrate 720 may be employed to transmit image signals to the LCD panel 700. Spacers 730 may be employed to maintain a gap between the LCD panel 700 and the BLU 800.

The BLU 800 may be formed by coupling the electron emission device 101 with the front panel 102, as depicted in FIGS. 1 and 2. The BLU 800 may receive power through a connecting cable 104, and may emit visible light V through the second substrate 90 on the front face of the electron emission device, so as to illuminate the LCD panel 700. The configuration of the electron emission device 101 and the front panel 102 of the present embodiment may be the same as the configuration described with reference to FIGS. 1 and 2, and, accordingly, details thereof will not be repeated.

The configuration and operation of the flat panel display device will now be described with reference to FIG. 8. Referring to FIG. 8, electrons may be emitted due to an electric field formed by the cathode electrode 120 and the gate electrode 140 of the electron emission device 101. The electrons may be focused by a focusing electrode (not shown). A voltage may be applied to the anode electrode 80 on the front panel 102 in order to accelerate electrons emitted from the electron emission sources 150 toward the anode electrode 80. The accelerated electrons may collide with the phosphor layer 70, exciting the phosphor layer 70 to emit visible light. The visible light may be transmitted through the LCD panel 700.

The LCD panel 700 may include a second substrate 505, a buffer layer 510 formed on the second substrate 505 and a semiconductor layer 580 having a predetermined pattern formed on the buffer layer 510. A first insulating layer 520 may be formed on the semiconductor layer 580, a gate electrode 590 having a predetermined pattern may be formed on the first insulating layer 520 and a second insulating layer 530 may be formed on the gate electrode 590.

After the second insulating layer 530 is formed, the first insulating layer 520 and the second insulating layer 530 may be etched using, e.g., a dry etching process, to expose a portion of the semiconductor layer 580, and a source electrode 570 and a drain electrode 610 may be formed on a predetermined region including the exposed portion.

After the source electrode 570 and the drain electrode 610 are formed, a third insulating layer 540 may be formed, and a planarizing layer 550 may be formed on the third insulating layer 540. After the third insulating layer 540 and the planarizing layer 550 are etched, a first electrode 620 may be formed in a predetermined pattern on the planarizing layer 550, such that the drain electrode 610 and the first electrode 620 are in contact with each other.

Separately, a transparent first substrate 680 may be provided and a color filter layer 670 may be formed on a lower surface 680a of the first substrate 680. A second electrode 660 may be formed on a lower surface 670a of the color filter layer 670, and a first alignment layer 630 and a second alignment layer 650 that align liquid crystal molecules of a liquid crystal layer 640 may be formed on the surfaces of the first electrode 620 and the second electrode 660 that face each other. A spacer 560 that defines the liquid crystal layer 640 may be formed between the color filter layer 670 and the planarizing layer 550.

A first polarizing layer 500 may be formed on a lower surface of the second substrate 505, and a second polarizing layer 690 may be formed on an upper surface 680b of the first substrate 680. A protection film 695 may be formed on an upper surface 690a of the second polarizing layer 690.

The operating principle of the liquid crystal display panel 700 will now be described briefly. A potential difference between the first electrode 620 and the second electrode 660 may be formed by applying an external signal, controlled by the gate electrode 590, the source electrode 570 and the drain electrode 610. The potential difference determines the arrangement of liquid crystal particles in the liquid crystal layer 640, and visible light emitted from the backlight unit 800 is blocked or transmitted by the liquid crystal layer 640 according to the arrangement of the liquid crystal particles in the liquid crystal layer 640 to realize the desired image. The visible light transmitted through the liquid crystal layer 640 may be colored by passing it through the color filter layer 670.

The BLU 800 may be configured to provide light-emitting pixels and control of the light emitted thereby, where the pixel resolution conforms to the resolution of the LCD panel 700. Thus, as individual pixels of the LCD panel 700 are "turned off", i.e., where the electric field is applied to the liquid crystal particles so that light is not transmitted through the LCD panel 700 in the respective pixels, then light emission from corresponding pixels of the BLU may likewise be turned off in order to conserve power.

In FIG. 8, a LCD panel 700, which may be, e.g., a thin film transistor (TFT) LCD is depicted as an example. However, the flat panel display device is not limited thereto and various non-emissive display devices besides the LCD panel 700 may be used in conjunction with the electron emission device according to the present invention.

In the flat panel display device having the electron emission device included in the BLU described above, the electron emission device may exhibit increased current density, high electron emission efficiency and a long lifespan. Therefore, a flat panel display device that employs the electron emission device as a BLU may exhibit increased image brightness and a long life span.

Further, an electron emission device according to the present invention may provide higher current density at lower power consumption than a conventional electron emission device. Therefore, when the electron emission device is employed in a BLU for a non-emissive display device, or when employed as display device itself, the brightness of an image and light emission efficiency may be increased.

Moreover, the use of the electron emission material having a thermal electron emission layer according to the present invention may significantly increase the lifetime of devices employing the electron emission material.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An electron emission material, comprising:
   an electron emission material main body that emits electrons through field emission when a voltage is applied thereto;
   a base metal layer disposed on the electron emission material main body; and
   a thermal electron emission layer disposed on the base metal layer.

2. The electron emission material as claimed in claim 1, wherein the electron emission material main body is a carbon nanotube, and the base metal layer is disposed on a top surface and a lateral surface of the electron emission material main body.

3. The electron emission material as claimed in claim 1, wherein the thermal electron emission layer includes at least one of BaO, SrO and CaG.

4. The electron emission material as claimed in claim 3, wherein the thermal electron emission layer is formed by applying a carbonate coating to the base metal layer and then heating until the coating decomposes to release carbon dioxide.

5. The electron emission material as claimed in claim 3, wherein the base metal layer is a Ni alloy and includes about 0.01 to about 0.5 wt % of at least one of Mg and Si, based on the weight of the Ni alloy.

6. The electron emission material as claimed in claim 1, wherein a total thickness of the base metal layer and the thermal electron emission layer is about 1 nm to about 1000 nm.

7. An electron emission panel, comprising:
   a first substrate;
   a cathode electrode disposed on the first substrate;
   an electron emission material electrically connected to the cathode electrode; and
   a gate electrode spaced apart from the cathode electrode, wherein the electron emission material includes:
   an electron emission material main body;
   a base metal layer disposed on the electron emission material main body; and
   a thermal electron emission layer disposed on the base metal layer.

8. The electron emission panel as claimed in claim 7, wherein the panel operates to emit electrons through field emission, and operating the panel so as to emit electrons through field emission elevates the temperature of the electron emission material so as to emit thermionic electrons.

9. The electron emission panel as claimed in claim 7, wherein the gate electrode is disposed on the first substrate, the electron emission panel further includes a first insulating layer disposed on the cathode electrode and the first substrate, and the first insulating layer is disposed between the gate electrode and the cathode electrode.

10. The electron emission panel as claimed in claim 7, wherein the cathode electrode and the gate electrode are disposed side-by-side on the first substrate, the cathode electrode and the gate electrode each have a layer of the electron emission material disposed thereon, and the layer of electron emission material disposed on the cathode electrode is separated from the layer of electron emission material disposed on the gate electrode by a predetermined gap.

11. The electron emission panel as claimed in claim 7, further comprising:

a second substrate spaced apart from the first substrate;

an anode electrode disposed on the second substrate; and a phosphor layer disposed on the second substrate.

12. The electron emission panel as claimed in claim 11, further comprising a display disposed facing the electron emission panel, wherein the display includes a plurality of pixels for forming an image, and light produced by the electron emission panel illuminates the display.

13. An electron emission panel operable to produce electrons using field emission and thermionic emission of electrons, the electron emission panel comprising:

a first electrode on a first substrate;

an electron emission material in contact with the first electrode, the electron emission material including:

a field emitter having a metal layer thereon; and a thermal electron emission layer on the metal layer;

a second electrode; and a third electrode, wherein the electron emission panel induces field emission and thermionic emission of electrons from the electron emission material upon application of one or more electrical signals to the first, second and third electrodes.

14. The electron emission panel as claimed in claim 13, further comprising:

a light emitting material positioned to receive electrons emitted from the electron emission material, wherein the light emitting material emits visible light upon excitation by the electrons emitted from the electron emission material.

15. The electron emission panel as claimed in claim 13, wherein an inner space of the panel is maintained in a vacuum state, the electron emission material and the light emitting material being disposed in the inner space and separated by a predetermined distance.

16. The electron emission panel as claimed in claim 13, wherein the electron emission material is a carbon nanotube, and the metal layer is disposed on a top surface and a lateral surface of the electron emission material.

17. An electron emission material including an electron emission material main body that emits electrons through field emission when a voltage is applied thereto, and a thermal electron emission layer, the electron emission material formed by a process of:

providing the electron emission material main body that emits electrons through field emission when the voltage is applied thereto;

forming a base metal layer on the electron emission material main body; and forming the thermal electron emission layer on the base metal layer.

18. The electron emission material as claimed in claim 17, wherein the electron emission material main body is a carbon nanotube, and the base metal layer is formed on a top surface and a lateral surface of the electron emission material main body.

19. The electron emission material as claimed in claim 17, wherein the thermal electron emission layer includes at least one of BaO, SrO and CaO.

20. The electron emission material as claimed in claim 19, wherein the thermal electron emission layer formed by:

applying at least one of $BaCO_3$, $SrCO_3$ and $CaCO_3$ to the base metal layer; and converting the at least one of $BaCO_3$, $SrCO_3$ and $CaCO_3$ to the at least one of BaO, SrO and CaO, respectively, using in situ decomposition.

21. The electron emission material as claimed in claim 20, wherein the base metal layer is a Ni alloy and includes about 0.01 to about 0.5 wt % of at least one of Mg and Si, based on the weight of the Ni alloy.

* * * * *